(12) United States Patent
Inaba et al.

(10) Patent No.: US 6,298,344 B1
(45) Date of Patent: Oct. 2, 2001

(54) DOCUMENT SEARCHING APPARATUS

(75) Inventors: Mitsuaki Inaba, Tokyo; Naohiko Noguchi; Yuji Kanno, both of Yokohama; Mitsuhiro Sato, Atsugi; Hayashi Ito, Matsudo, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/277,197

(22) Filed: Mar. 26, 1999

(30) Foreign Application Priority Data

Mar. 28, 1998 (JP) .................................................. 10-100328

(51) Int. Cl.⁷ .................................................. G06F 17/30

(52) U.S. Cl. .................................. 707/5; 707/9; 707/104; 707/513; 709/203; 709/219; 706/12; 725/116; 345/327; 345/340

(58) Field of Search .................................. 707/1–5, 9, 10, 707/104, 201, 513, 6, 531; 706/12; 709/203, 218, 219; 725/116; 345/340, 327

(56) References Cited

U.S. PATENT DOCUMENTS

| | | | |
|---|---|---|---|
| 5,515,488 | * 5/1996 | Hoppe et al. | 345/440 |
| 5,694,592 | * 12/1997 | Driscoll | 707/3 |
| 5,761,497 | * 6/1998 | Holt et al. | 707/5 |
| 5,771,378 | * 6/1998 | Holt et al. | 707/5 |
| 5,802,518 | * 9/1998 | Karaev et al. | 707/9 |
| 5,835,087 | * 11/1998 | Herz et al. | 345/327 |
| 5,933,822 | * 8/1999 | Braden-Harder et al. | 707/5 |
| 6,041,326 | * 3/2000 | Amro et al. | 707/10 |
| 6,067,552 | * 5/2000 | Yu | 707/501 |
| 6,088,692 | * 7/2000 | Driscoll | 707/5 |
| 6,178,419 | * 1/2001 | Legh-smith et al. | 707/6 |
| 6,212,517 | * 4/2001 | Sato et al. | 707/5 |
| 6,219,665 | * 4/2001 | Shiomi | 707/6 |

OTHER PUBLICATIONS

Garner, Harold et al., "Gene Alert–a sequence search results keyword parser", IEEE Engineering in Medicine and Biology MAgazine, vol.: 17, Issue: 2, Mar.–Apr. 1998, pp. 119–122.*

Kelter, Udo, "An Information Retrieval Common Service Based on H–PCTE", Proceedings of the 1993 Software Engineering Environments Conference, Jul. 7–9, 1993, pp. 101–108.*

Pretschner, Alexander et al., "Ontology Based Personalized Search", Proceedings of the 11th IEEE International Conference on Tools with Artificial Intelligence, Nov. 9–11, 1999, pp. 391–398.*

* cited by examiner

Primary Examiner—Hosain T. Alam
Assistant Examiner—Shahid Alam
(74) Attorney, Agent, or Firm—Connolly Bove Lodge & Hutz

(57) ABSTRACT

A searching apparatus includes an index generation portion for generating an index to provide data of the number of documents including the key word and the number of appearances of the key word. Matching degrees between the key word and documents are calculated from the number of documents including the key word and the number of appearances of the key word. A portion of documents are arranged in order of the matching degree in a buffer which are outputted as the searching result. Lower rank documents regarding the matching degree are searched by comparing the lowest matching degree of the neighbour higher ranked document arranged in the buffer. At first time searching, data of the latest edition of the documents stored in a memory is detected and stored and is used to provide second time searching operation to eliminate inconsistency in the searching result between the editions at first and second time searching operations. The index is generated every field of each document. The matching degree of combined field is calculated by logical operation between the two fields. Moreover, an index of combined field may be generated and one of field of the combined field may be omitted. The matching degree of the other field is also obtained by another logical operation.

8 Claims, 13 Drawing Sheets

| HEAD LINE =M CORP. |
|---|

| THE NO. OF DOC | 200 |
|---|---|

| DOC NO. | NO. OF TIMES OF APP |
|---|---|
| 2 | 1 |
| 8 | 2 |
| 15 | 1 |
| 27 | 1 |
| 30 | 2 |
| ⋮ | ⋮ |

| ARTICLE= M CORP. |
|---|

| THE NO. OF DOC | 1500 |
|---|---|

| DOC NO. | NO. OF TIMES OF APP |
|---|---|
| 3 | 3 |
| 8 | 5 |
| 7 | 4 |
| 10 | 5 |
| 15 | 1 |
| ⋮ | ⋮ |

| ARTICLE= NEW PROD |
|---|

| THE NO. OF DOC | 1000 |
|---|---|

| DOC NO. | NO. OF TIMES OF APP |
|---|---|
| 3 | 2 |
| 6 | 3 |
| 8 | 4 |
| 15 | 7 |
| 17 | 3 |
| ⋮ | ⋮ |

FIG. 7

| | HEADLINE=M CORP. | ARTICLE=M CORP. | ARTICLE=NEW PROD |
|---|---|---|---|
| THE NO. DOC | 200 | 1500 | 1000 |

| DOC NO. | THE NO. OF TIMES OF APP | THE NO. OF TIMES OF APP | THE NO. OF TIMES OF APP |
|---|---|---|---|
| 3 | 0 | 3 | 2 |
| 8 | 2 | 5 | 4 |
| 15 | 1 | 1 | 7 |
| ⋮ | ⋮ | ⋮ | ⋮ |

FIG. 8

| | HEADLINE=M CORP. | ARTICLE=M CORP. | ARTICLE=NEW PROD |
|---|---|---|---|
| IDF | 1−log(200/5000)=5.64 | 1−log(1500/5000)=2.74 | 1−log(1000/5000)=3.32 |

FIG. 9

| DOC NO. | MATCHING DEGREE |
|---|---|
| 3 | 0×5.64+3×2.74+2×3.32=14.86 |
| 8 | 2×5.64+5×2.74+4×3.32=38.26 |
| 15 | 1×5.64+1×2.74+7×3.32=31.62 |
| ⋮ | ⋮ |

| | HEAD LINE + ARTICLE=M CORP. | ARTICLE= NEW PROD |
|---|---|---|
| IDF | 1−log(1600/5000)=2.24 | 1−log(1000/5000)=3.32 |

| DOC NO. | MATCHING DEGREE |
|---|---|
| 3 | 3×2.24+2×3.32=13.36 |
| 8 | 7×2.24+4×3.32=28.96 |
| 15 | 2×2.24+7×3.32=27.72 |
| ⋮ | ⋮ |

FIG. 12A

ARTICLE+HEAD LINE = M CORP.

| THE NO. OF DOC | 1600 |
|---|---|

| DOC NO. | THE NO. OF TIMES OF APPEARANCES |
|---|---|
| 2 | 1+0 |
| 3 | 0+3 |
| 8 | 2+5 |
| 7 | 0+4 |
| 10 | 0+5 |
| 15 | 1+1 |
| ⋮ | ⋮ |

FIG. 12B

ARTICLE = NEW PROD

| THE NO. OF DOC | 1000 |
|---|---|

| DOC NO. | THE NO. OF TIMES OF APPEARANCES |
|---|---|
| 3 | 2 |
| 6 | 3 |
| 8 | 4 |
| 15 | 7 |
| 17 | 3 |
| ⋮ | ⋮ |

FIG. 12C

HEAD LINE+ARTICLE= M CORP.    ARTICLE= NEW PROD

| THE NO. OF DOC | 1600 | 1000 |
|---|---|---|

| DOC NO. | THE NO. OF TIMES OF APPEARANCES | THE NO. OF TIMES OF APPEARANCES |
|---|---|---|
| 3 | 3 | 2 |
| 8 | 7 | 4 |
| 15 | 2 | 7 |
| ⋮ | ⋮ | ⋮ |

FIG. 16A

ARTICLE+ HEAD M LINE = CORP.

| THE NO. OF DOC | 1600 |
|---|---|
| DOC NO. | THE NO. OF TIMES OF APP. |
| 2 | 1 |
| 3 | 3 |
| 8 | 7 |
| 7 | 4 |
| 10 | 5 |
| 15 | 2 |
| ---- | ---- |

FIG. 16B

ARTICLE+ HEAD NEW LINE = PROD

| THE NO. OF DOC | 1040 |
|---|---|
| DOC NO. | THE NO. OF TIMES OF APP. |
| 3 | 2 |
| 6 | 4 |
| 7 | 1 |
| 8 | 4 |
| 15 | 9 |
| 17 | 3 |
| ---- | ---- |

FIG. 16C

HEAD NEW LINE = PROD  1601

| THE NO. OF DOC | 100 |
|---|---|
| DOC NO. | THE NO. OF TIMES OF APP. |
| 6 | 1 |
| 7 | 1 |
| 15 | 2 |
| 31 | 2 |
| ---- | ---- |

```
ARTICLE + HEAD_LINE = M_CORP.
```

| THE NO. OF DOC | 1600 |
|---|---|

| DOC NO. | THE NO. OF TIMES OF APP. |
|---|---|
| 2 | 1 |
| 3 | 3 |
| 8 | 7 |
| 7 | 4 |
| 10 | 5 |
| 15 | 2 |
| ⋮ | ⋮ |

```
ARTICLE = NEW_PROD
```

| THE NO. OF DOC | 1000 |
|---|---|

| DOC NO. | THE NO. OF TIMES OF APP. |
|---|---|
| 3 | 2−0 |
| 6 | 4−1 |
| 8 | 4−0 |
| 15 | 9−2 |
| 17 | 3−0 |
| ⋮ | ⋮ |

DOCUMENT SEARCHING APPARATUS

BACKGROUND OF THE INVENTION

1. Field of the Invention

This invention relates to a document searching apparatus.

2. Description of the, Prior Art

A document searching apparatus for storing a plurality of documents, receiving a searching request including key word data, and successively displaying a searching result on a display is known.

SUMMARY OF THE INVENTION

The aim of the present invention is to provide a superior document searching apparatus.

According to the present invention there is provided a first document searching apparatus including: a memory for storing a plurality of documents; a searching request receiving portion for receiving a searching request including key word data; a matching degree calculation portion responsive to the searching request for calculating matching degrees between the key word data and the documents in the memory; a buffer; an arranging portion responsive to the matching degree calculation portion for storing a portion of documents arranged in order of the calculated matching degrees, the number of the documents of the portion being equal to or less than a reference number; a searching result outputting portion for outputting the portion of documents from the buffer; a lowest matching degree detecting and storing portion responsive to the matching degree calculation portion for detecting and storing the lowest matching degree of the documents of the portion; a lower rank document searching request receiving portion for receiving a lower rank document searching request; and a lower rank document searching portion responsive to the lower rank document searching request for operating the matching degree calculation portion and the arranging portion to arrange, in the buffer, from the memory, a neighbor portion of the documents having the calculated matching degrees regarding the key word data less than the lowest matching degree from the lowest matching degree detecting and storing portion as an upper limit value in order of the calculated matching degrees of the neighbour portion and operating the searching result outputting portion to output the neighbour portion of documents from the buffer, the number of the documents of the neighbour portion being equal to or less than the reference number, so that arrangement of the documents in the buffer is provided with limitation of the matching degree within the requested the number of the results.

In the first document searching apparatus, the searching result outputting portion further outputs the calculated matching degrees correspondingly of the portion of documents arranged and outputs the calculated matching degrees correspondingly of the neighbour portion of documents arranged.

The first document searching apparatus may further include the number of results request receiving portion for receiving a request of the number of the documents in the portion and the neighbour portion to be outputted from the buffer as the reference number.

The first document searching apparatus may further include an index generating portion for generating an index correspondingly including a plurality of index key word data from the documents, document number data of the documents including each of the index key word data and data of the number of appearances of each of the index key word data every the document, wherein the matching degree calculation portion calculates the degrees of matching between the key word data and each of the documents with reference to the index when there is one of the index key word data corresponding to the key word data.

According to this invention, there is provided a second document searching apparatus including: a memory for storing a plurality of documents; a searching request receiving portion for receiving a searching request including key word data; a matching degree calculation portion responsive to the searching request for calculating matching degrees between the key word data and the documents in the memory; a buffer; an arranging portion responsive to the matching degree calculation portion for storing a portion of documents arranged in order of the calculated matching degrees, the number of the documents of the portion being equal to or less than a reference number; a searching result outputting portion for outputting the portion of documents from the buffer; a lowest matching degree detecting and storing portion responsive to the matching degree calculation portion for detecting and storing the lowest matching degree of the documents of the portion; a lower rank document searching request receiving portion for receiving a lower rank document searching request; a lower rank document searching portion responsive to the lower rank document searching request for operating the matching degree calculation portion and the arranging portion to arrange, in the buffer, from the memory, a lower rank portion of the documents having the calculated matching degrees regarding the key word data less than the lowest matching degree from the lowest matching degree detecting and storing portion as an upper limit value in order of the calculated matching degrees of the lower rank portion and operating the searching result outputting portion to output the lower rank portion of documents from the buffer, the number of the documents of the lower rank portion being equal to or less than the reference number; a highest matching degree detecting and storing portion responsive to the matching degree calculation portion for detecting and storing the highest matching degree of the documents of the lower rank portion; a higher rank document searching request receiving portion for receiving a higher rank document searching request; a higher rank document searching portion responsive to the higher rank document searching request for operating the matching degree calculation portion and the arranging portion to arrange, in the buffer, from the memory, a higher rank portion of the documents having the calculated matching degrees regarding the key word data higher than the highest matching degree from the highest matching degree detecting and storing portion as a lower limit value in order of the calculated matching degrees of the higher rank portion and operating the searching result outputting portion to output the higher rank portion of documents from the buffer, the number of the documents of the higher rank portion being equal to or less than the reference number, so that a neighbour lower ranked documents are searched without rranging other ranked documents.

According to this invention, there is further provided a third document searching apparatus including: a memory for storing a plurality of documents every edition which is renewable; a latest edit detection portion responsive to the memory for detecting the latest edition of the edition and generating latest edition data; a first searching request receiving portion for receiving a first searching request including key word data; a matching degree calculation portion responsive to the first searching request for calculating matching degrees between the key word data and the documents of the latest edition in the memory with reference to the latest edition data; a buffer; an arranging portion responsive to the matching degree calculation portion for storing a portion of documents of the latest edition indicated by the latest edition data arranged in order of the calculated matching degrees, the number of the documents of the portion being equal to or less than a reference number, the latest edition being referred as an used edition; an edition data storing portion for storing the latest edition data used in the arranging portion as used-edition data indicative of the used edition; a first searching result outputting portion responsive to the arranging portion for outputting the portion of documents from the buffer; a second searching request receiving portion for receiving a second searching request; a searching portion responsive to the second searching request for operating the matching degree calculation portion and the arranging portion to arrange a neighbour portion of the documents of the used edition indicated by the used-edition data in the buffer; and a second searching result outputting portion for outputting the neighbour portion of documents from the buffer, so that inconsistency between the searching results of the different editions can be prevented.

According to this invention, there is provided a fourth document searching apparatus including: a memory for storing a plurality of documents, each document including a plurality of fields; an index generation portion for generating indexes from the fields respectively, each index including a plurality of index key word data included in each field of the documents, document numbers of the documents including each of the index key word data, and the number of times of appearances of each of the index key word data in each field in the documents correspondingly; a buffer; a searching request receiving portion for receiving a searching request including key word data, and field data indicative of more than one of the fields; a calculating portion for calculating the number of times of appearances of one of a plurality of the index key word corresponding to the key word data as search data every document in each field and the number of documents including the search data in each field with reference to the indexes; an operation portion responsive to the field data for summing up the number of times of appearances of the search word data of respective fields of the more than one of the fields every document and the number of documents including the search data in the more than one of the fields in accordance with the result of the calculating portion; a matching degree calculation portion for calculating matching degrees between the key word data and the documents in the more than one of the fields in accordance with the result of the operation portion to provide combined matching degrees; an arranging portion for storing a portion of the documents in the buffer in order of the combined matching degrees; and a searching result outputting portion for outputting the portion of documents in response to the arranging portion.

According to this invention, there is a fifth document searching apparatus is provided which includes:a memory for storing a plurality of documents, each document including at least first and second fields; an index generation portion for generating a first index of the first field including a plurality of first index key word data included in the first field of the documents, document numbers of the documents including each of the first index key word data, and the number of times of appearances of each the first index key word data in the first field of the documents correspondingly and a second index of a combined field of the first and second fields including a plurality of second index key word data of the combined field of the documents, document numbers of the documents including each of the second index key word data, and the number of times of appearances of each of the second index key word data in the combined field in the documents, correspondingly; a buffer; a searching request receiving portion for receiving a searching request including key word data and field data of the second field; a calculating portion for calculating the number of times of appearances of one of a plurality of the first index key word data corresponding to the key word data as first search data every document and the number of documents including the first search data in the first field with reference to the first index and calculating the number of times of appearances of one of a plurality of the second index key word data corresponding to the key word data as second search data every document and the number of documents including the second search data in the combined field with reference to the second index of a combined field; an operation portion responsive to the field data for subtracting the number of times of appearances of the first search data every document in the first field from the number of times of appearances of the second search data every document in the combined field and obtaining the number of documents including either of the first or second search word data in the combined field with reference to the first and second indexes; a matching degree calculation operation for calculating matching degrees between the key word data and the documents in the second field in accordance with the result of the operation portion; an arranging portion for storing a portion of the documents in the buffer in order of the matching degrees; and a searching result outputting portion for outputting the portion of documents in response to the arranging portion.

BRIEF DESCRIPTION OF THE DRAWINGS

The object and features of the present invention will become more readily apparent from the following detailed description taken in conjunction with the accompanying drawings in which:

FIG. 7 is a table of the first embodiment showing a logical operation result;

FIG. 8 is a table of the first embodiment showing operation for obtaining IDF;

FIG. 9 is a table of the first embodiment showing operation for obtaining the matching degree REL (D);

FIGS. 12A to 12C are tables of the second embodiment showing intermediate searching results;

FIGS. 16A to 16C are tables of the third embodiment;

The same or corresponding elements or parts are designated with like references throughout the drawings.

DETAILED DESCRIPTION OF THE INVENTION (FIRST EMBODIMENT)

Figure 1:
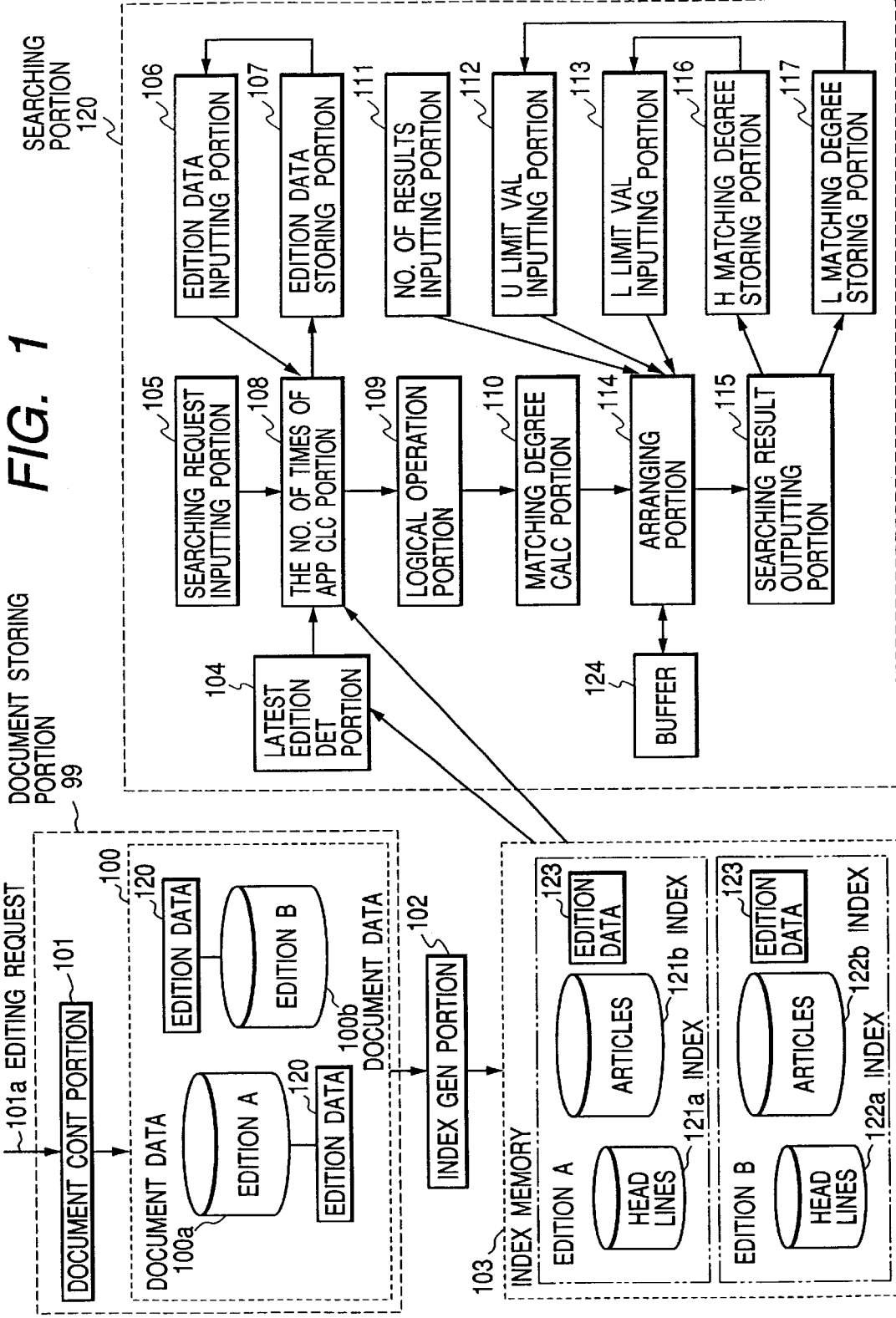
FIG. 1 is a block diagram of a document searching apparatus the first embodiment.

FIG. 1 is a block diagram of a document searching apparatus the first embodiment.

A document searching apparatus of the first embodiment includes a document storing portion 99 including a memory 100 such as a hard disc unit for storing documents every edition and a document control portion 101 for controlling the memory 100, an index generation portion 102 for generating indexes 121a, 121b, 122a, and 122b, and a searching portion 120 for receiving a searching request and outputting a searching result on a display (not shown) or the like.

Each of document includes articles and corresponding head lines and may be rewritten every edition. The document control portion 101 stores the documents in the memory 101 every edition (A and B) in response to an editing request 101a and stores edition data 120 with documents of every edition. More specifically, at first, the document control portion 101 stores the documents of the edition A and the edition data 120 indicative of the edition A. Then, in response to the editing request, the document control portion 101 stores the documents of the edition B and the edition data 120 indicative of the edition B.

The index generation portion 102 generates indexes every field every edition. That is, in response to storing the documents of the edition A in the memory 100, the index generation portion 102 generates an index 121a of head lines and an index 121b of articles from the documents of the edition A in the memory 100. Then, in response to storing the documents of the edition B in the memory 100, the index generation portion 102 generates an index 122a of head lines and an index 122b of articles from the documents of the edition B in the memory 100. Moreover, the index generation portion 102 stores the indexes 121a and 121b with the edition data 123 indicative of the edition A from the edition data 120 in an index memory 103 and stores the indexes 122a and 122b with the edition data 123 indicative of the edition B from the edition data 120 in an index memory 103.

Figures 17A, 17B, 18:
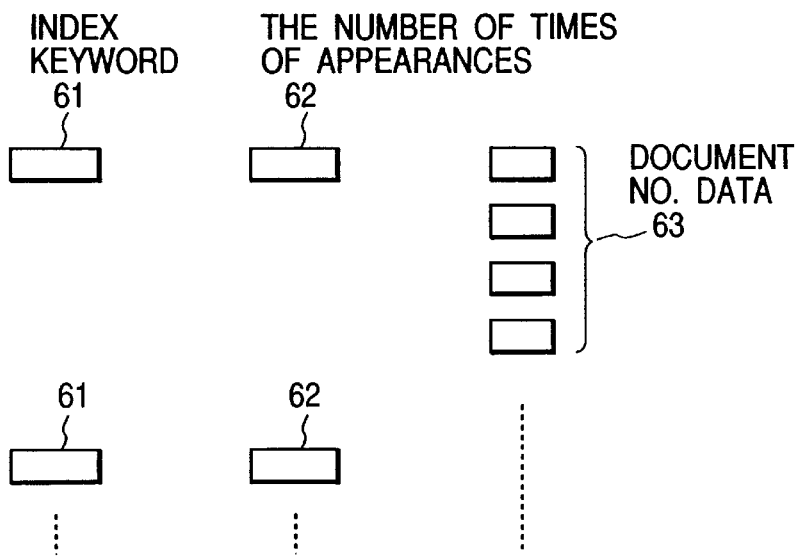
FIGS. 17A and 17B are tables of calculating result of the number of times of appearances and logic operation result.
FIG. 18 is an illustration of the first embodiment showing an index.

FIG. 18 is an illustration of the first embodiment showing an index.

The index generation portion 102 generates indexes 121a, 121b, 122a, and 122b as follows:

Regarding the edition A, the index generation portion 102 detects index key words 61, the number of times of appearances 62 of all index key words in each field of each document and stores index key words 61 in each field of each document from the document data 100a, corresponding the number of times of appearances of index key words 62 in each field of each document, and the document number of each document 63 as the index 121a or 121b. Similarly, the index generation portion 102 generates and stores other indexes 122a and 122b from the document data 100b as the index 122a or 122b.

The searching portion 120 includes a latest edition detection portion 104 for detecting the latest edition from the edition data 123, a searching request inputting portion 105 for receiving a searching request including key word data, the number of times of appearance calculation portion 108, an edition data storing portion 107 for storing the edition data which is used for calculating the number of times of appearances of the key word data, an edition data inputting portion 106 for supplying the edition data in the edition data storing portion 107 to the number of times of appearance calculation portion 108, a logical operation portion 109 for effecting a logical operation, a matching degree calculation portion 110 for calculating a matching degree between the key word data and documents, an arranging portion 114 for arranging documents in a buffer 114a in order of the calculated matching degrees, a searching result outputting portion 115 for outputting the arranged documents or a portion of the arranged documents on a display or a paper, a the number of results inputting portion 111 for receiving a request of the number of documents to be outputted, a highest matching degree storing portion 116 for detecting and storing a highest matching degree of the arranged documents, a lower limit value inputting portion 113 for supplying the highest matching degree from the highest matching degree storing portion 116 as a lower limit value, a lowest matching degree storing portion 117 for detecting and storing the lowest matching degree, and a matching upper limit inputting portion 112 for supplying the lowest matching degree from the lower matching degree storing portion 117 as a matching degree upper limit value to the arranging portion 114.

Figure 2:
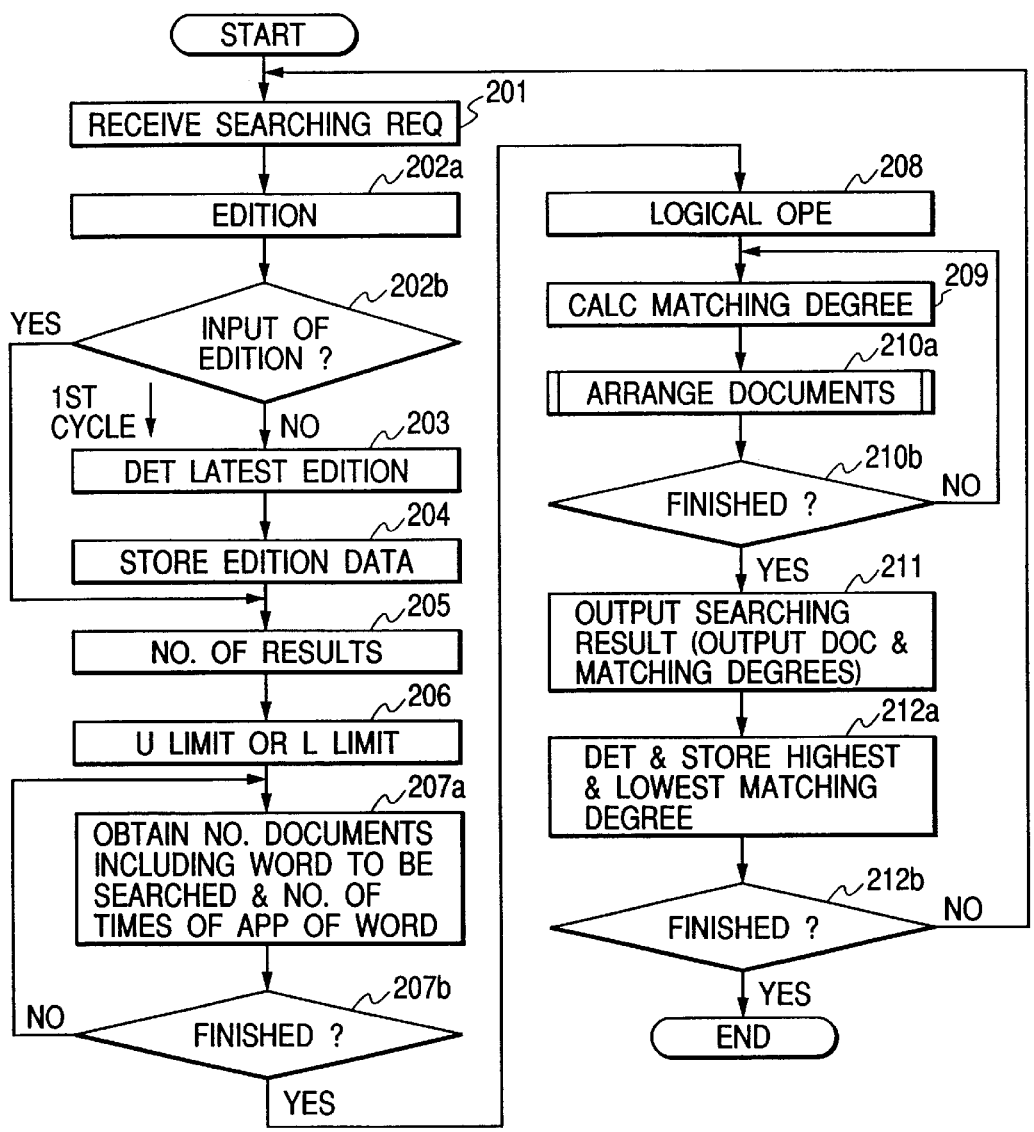
FIGS. 2 and 3 depict flow charts of the first embodiment.
Figure 3:
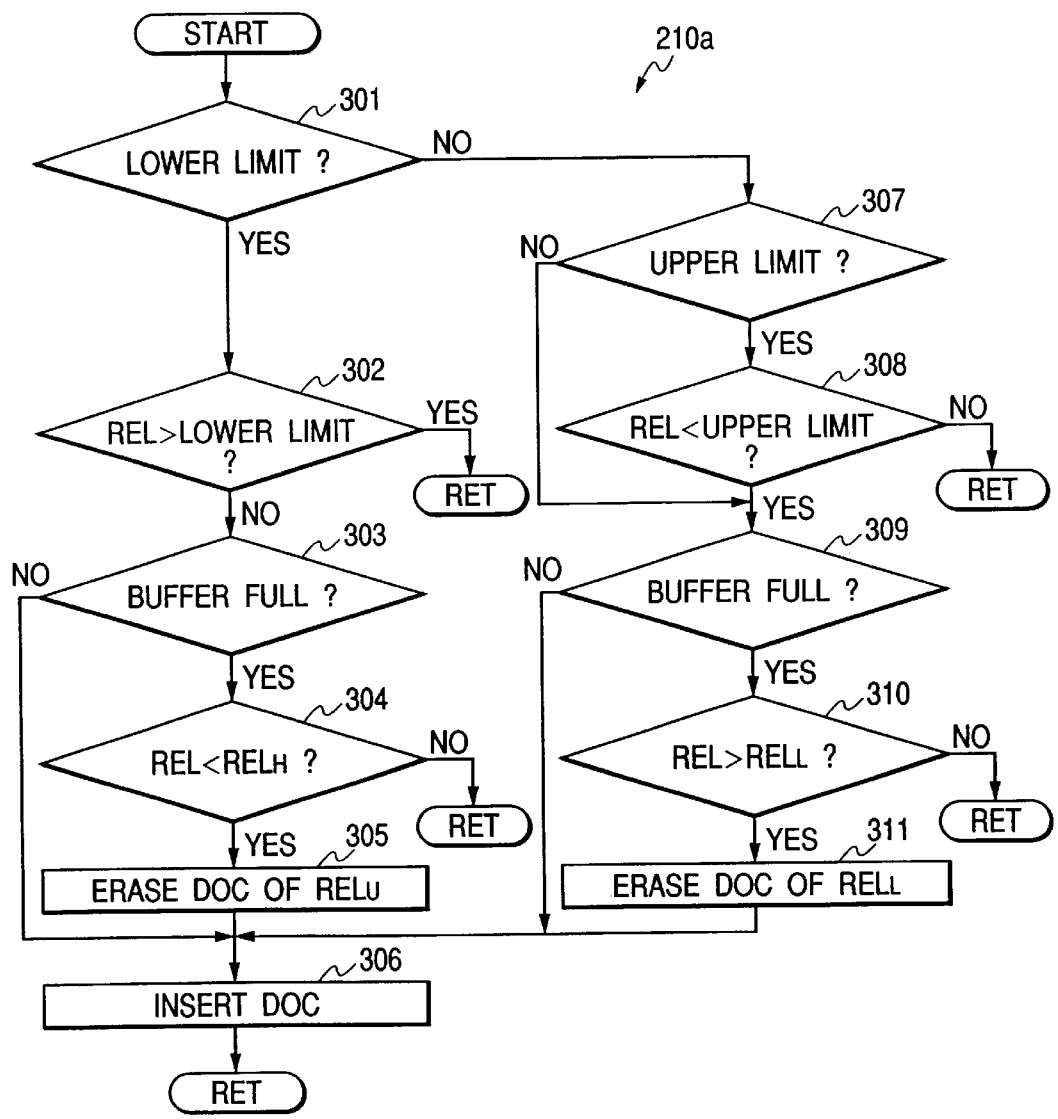
Figure 4:
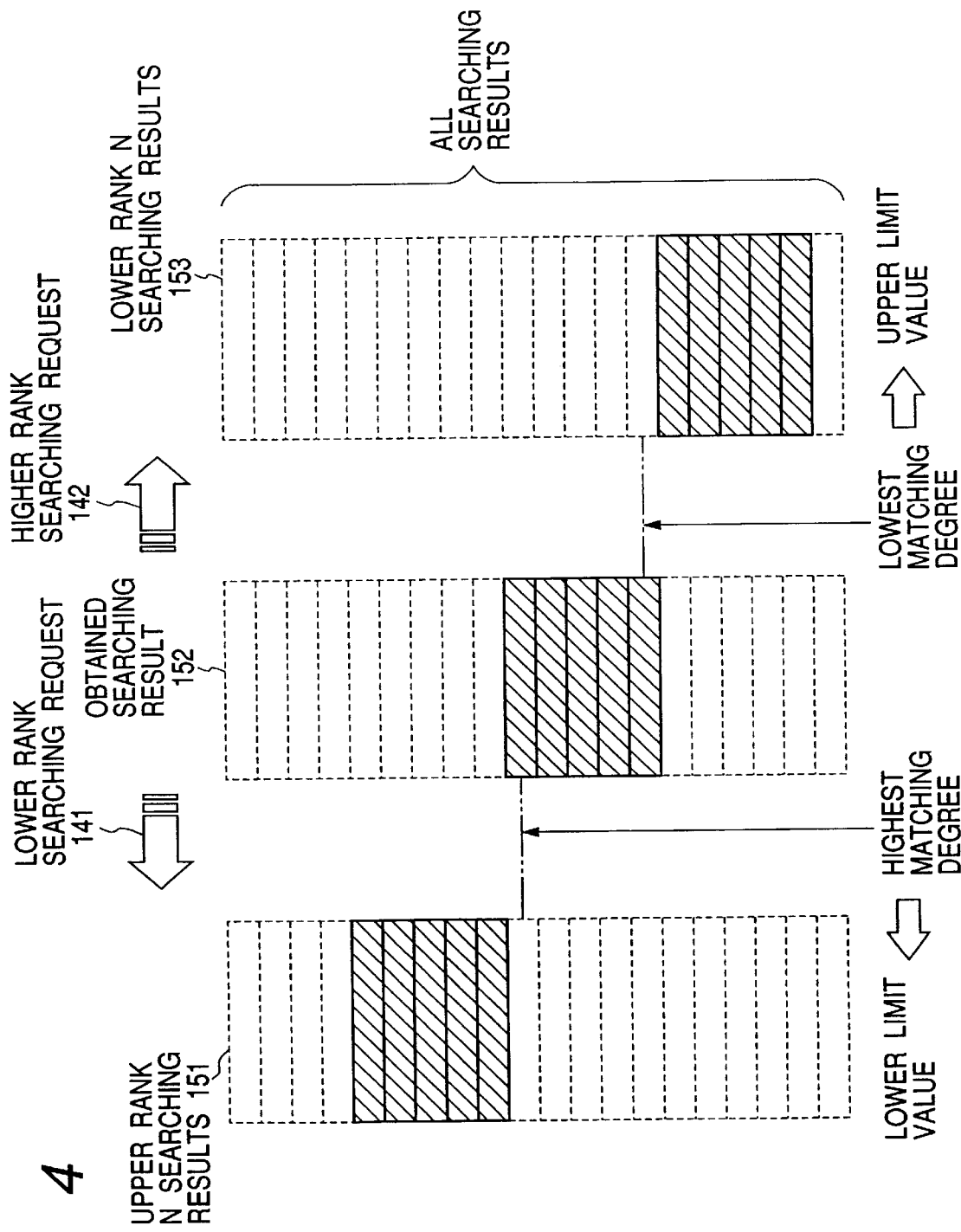
FIG. 4 is an illustration of the first embodiment showing a searching operation.
Figures 5, 6A, 6B, 6C:
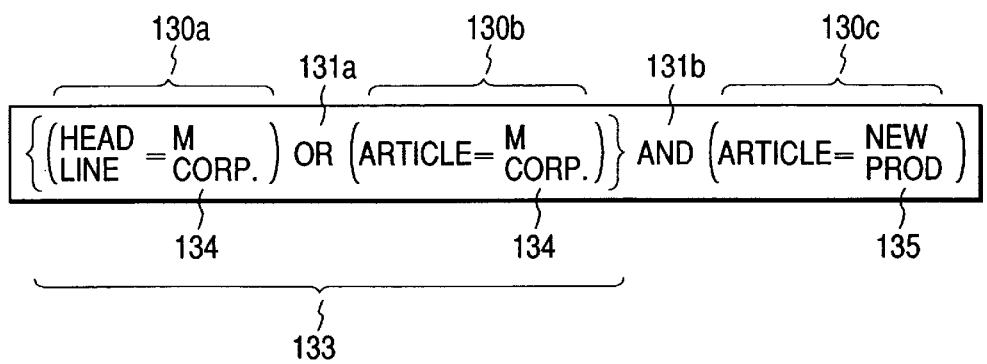
FIG. 5 is an illustration of the first embodiment showing a searching request.
FIGS. 6A to 6C are tables of the first embodiment showing results of the number of times appearance calculation portion, which are also referred in a second embodiment.

FIGS. 2 and 3 depict flow charts of the first embodiment. FIG. 4 is an illustration of the first embodiment. FIG. 5 is an illustration of the first embodiment showing a searching request. FIGS. 6A to 6C are tables of the first embodiment showing results of the number of times appearance calculation portion 108, which are also referred in a second embodiment. FIG. 7 is a table of the first embodiment showing a logical operation result.

At first, the operation obtaining ten upper ranking results will be described.

In step 201, the user inputs a searching request character train as the searching request as shown in FIG. 5 with the searching request inputting portion 105. The searching request character train includes pairs 130a, 131b, and 130c of fields and key word data 134 and 135 wherein pairs are connected with logical operators 131a or 131b (OR, AND).

In step 202a, the user specifies the edition. However, at first cycle of searching operation, the user is not allowed to input the edition. That is, at first searching operation, processing essentially bypasses the step 202. In the following step 203, in the case of the first cycle of searching operation, the latest edition is detected from the edition data 123. At second cycle of searching operation, the edition is specified by the user in step 202.

At the first cycle of the searching operation, in step 204, the edition data (A) is stored in the edition data storing portion 107. At second searching operation, the edition is specified by the user or inputted from edition data inputting portion 106 in step 202a and the edition specifying data is stored in the edition data storing portion 107.

In step 205, the number of desired results is inputted through the number of result inputting portion 111.

In step 206, an upper limit value or a lower limit value is inputted. However, at the first cycle of searching operation, no value is inputted. That is, at first searching operation, processing essentially bypasses the step 206.

In step 207a, the number of times of appearance calculation portion 108 obtains the number of documents including the words to be searched corresponding to the key word data, the document number of the documents including the words, and the number of times of appearances of the words every pair of the field ever key word data as shown in FIGS. 6A to 6C with reference to indexes, when at least one of the index key words corresponds to the word in the documents indicated by key word data 134.

In step 207b, it is judged whether processing in step 207a has finished to all key word data. If there is a remaining key word to be processed, processing in step 207a is repeated.

If all key word data has been processed in step 207b, in step 208, a logical operation (109) is effected in step 208 to provide a logical operation result as shown in FIG. 7. More specifically, in response to receiving the searching request character train shown in FIG. 5, each pair of a field and key word data (head line=M corp., etc.) processed in step 207a to provide the number of documents including the key word data "M corp." in the head line, that is, 200 and the document number (document identification data) including the key word data, and the number of times of appearances of the key word data each field of each document as shown in FIGS. 6A to 6C. Then, in step 208, the logical operation is effected to provide the logical operation result as shown in FIG. 7, wherein the document number 2 is neglected. This is because, at first, a logical operation is effected between the pairs 130a and 130b in accordance with the operator data 131a which is OR, then, the result is the number of document 2 shows the number of times of appearance=1. Then, the second operation between this result 133 and the pair 130c is effected in accordance with the operator data 131b which is AND. Then, there is no appearance of the key word data, new product at the pair 130c, in the article in the document having the document number 2, so that the result of the AND operation is zero. Then, at the logical operation result in FIG. 7, the appearance of M corp. in the head line in the document number 2 is neglected. On the other hand, processing results of the document numbers 3, 8, and 15 in step 207a exist in the logical operation result as shown in FIG. 7.

In step 209, matching degrees are calculated by the matching degree calculation portion 110. The matching degree REL (D) is given as follows:

REL (D)=Σ (the number of times of appearances of the word ×IDF)

IDF=1- $\log_2$ (the number of documents including the word/the total number of documents)

FIG. 8 is a table of the first embodiment showing operation for obtaining IDF. FIG. 9 is a table of the first embodiment showing operation for obtaining the matching degree REL (D).

In step 210a, the document of which matching degree has been calculated in step 209 is arranged by the arranging portion 114 in the buffer 124 in order of the matching degree. This processing is repeated until finish of this processing is judged in step 210b.

This arranging processing will be described more specifically. FIG. 3 depicts a flow chart of the first embodiment showing the processing in step 210a.

At the first cycle of searching operation, the processing proceeds to step 309 because the lower limit value and the upper limit value have not been stored.

In step 309, it is judged whether the buffer 124 is full. If the buffer 124 is not full, processing proceeds to step 306 where the document is inserted at a suitable location in the buffer 124 to be arranged in the order of the matching degree. If the buffer 124 is full in step 309, it is judged whether the matching degree REL of this document is higher than the matching degree $REL_L$ of the document ranked at the lowest position in the buffer 124. If the matching degree REL of this document is higher than the matching degree RELL of the document ranked at the lowest position in the buffer 124, the matching degree $REL_L$ of the document ranked at the lowest position in the buffer 124 is erased from the buffer 124 in step 311 and then, the this document is inserted in the buffer 124 at the suitable position to provide the arrangement of the documents in order of the matching degree. If the matching degree REL of this document is not higher than the matching degree $REL_L$ of the document ranked at the lowest position in the buffer 124, processing returns without arranging this document.

When the processing of the steps 209, 210a and 210b has finished, the searching result is outputted by the searching result outputting portion 115 by reading the data in the buffer 124 and displaying the arranged documents on the display (not shown). Then, highest and the lowest matching degrees of the arranged documents are detected and stored in the highest matching degree storing portion 116 and the lowest matching degree storing portion 117 in step 212a. The highest matching degree $REL_H$ is obtained from the matching degree of the first ranked document and the lowest matching degree $REL_L$ is obtained from the matching degree of the eleventh-ranked document.

Then, the user is inquired as to whether the user desires to finish the searching operation in step 212b. If YES, processing ends. If NO, processing returns to step 201.

Then, the following searching operation for obtaining the searching result of the documents ranked from eleventh to twentieth will be described.

After step 212b, the second cycle of searching operation starts. In the second cycle of searching operation, it has been determined that the searching operation is for obtaining the searching result of the documents ranked from eleventh to twentieth, so that the searching operation for lower ranks is automatically effected. That is, the edition data in the edition data storing portion 107 is inputted to and used in the number of times of appearance calculation portion 108 and the lower matching degree in the lower matching degree storing portion 117 is is inputted to and used in the arranging g portion 114. However, in the third cycle of the searching operation, the user is required to the input searching request including a lower rank searching request command or higher rank searching request command.

In step 202a, the number of the times of appearance calculation portion 108 receives the edition data "A" from the edition data storing portion 107. Because the edition is specified, that is, "A", so that processing proceeds to step 205 from the step 202b. This makes the searching operation is made regarding the edition A, so that if there is the latest edition B in the document storing portion 99 at this instance, the matching between the first cycle searching operation and the second cycle searching operation is required.

In step 205, if the number of the results is not inputted, the number of the results is still ten, so that the searching operation for obtaining the searching result of the documents ranked from eleventh to twentieth is effected. In the following step 206, the lowest matching degree stored in step 212a in lowest matching degree storing portion 117 is inputted to be used in the arranging portion 114 as upper limit value by the upper limit value inputting portion 112. Then, steps 207a, 207a, 208, and 209 are executed similarly as mentioned above. In step 210a, the document showing the matching degree less than the upper limit is arranged in the buffer 124. That is, in step 307, the upper limit has been set, so that the matching degree of the document is compared with the upper limit value in step 308. If the matching degree of the document is less than the upper limit value, the document is arranged in the buffer 124 in order of the matching degree. Processing from step 209 to 210b is repeated to obtain the searching result of eleventh to twentieth ranks. Then, a portion of the documents arranged in the buffer 124 are outputted in step 211. In step 212a, the eleventh rank of the matching degree is stored in the highest matching degree storing portion 116 and the twentieth rank of the matching degree is stored in the lowest matching degree storing portion 117.

In the third cycle of searching operation, the user can select the lower ranking searching operation or the higher ranking operation, so that the searching request further includes a lower ranking searching request or a higher ranking searching request alternatively.

If the lower ranking searching request is inputted, the searching result is obtained and outputted as similar to the searching operation for the eleventh to twentieth ranks of documents. On the other hand, if higher ranking operation is inputted, the highest matching degree is inputted to the arranging portion 114 to be used as a lower limit value. Then, in step 302 after step 301, the matching degree is compared with the lower limit. If the matching degree of the document is higher than the lower limit value, the document is arranged in the buffer 124 in order of the matching degree if the buffer is not full.

If the buffer 124 is full in step 309, it is judged whether the matching degree REL of this document is lower than the matching degree $REL_{520}$ of the document ranked the highest position in the buffer 124. If the matching degree REL of this document is lower than the matching degree $REL_{520}$ of the document ranked the highest position in the buffer 124, the matching degree $REL_{520}$ of the document ranked the highest position in the buffer 124 is erased from the buffer 124 in step 305 and then, the this document is inserted in the buffer 124 at the suitable position to provide the arrangement of the documents in order of the matching degree. If the matching degree REL of this document is not lower than the matching degree $REL_{520}$ of the document ranked at the highest position in the buffer 124, processing returns without arranging this document. Processing from step 209 to 210b is repeated to obtain the searching result of eleventh to twentieth ranks. Then, the document arranged in the buffer 124 is outputted in step 211. In step 212a, the highest matching degree of the documents stored in the buffer 124 is stored in the highest matching degree string portion 116 and the lowest matching degree of the documents in the buffer 124 is stored in the lowest matching degree storing portion 117.

As mentioned, the neighbour group of ranking results can be obtained with minimum arrangement of document in the buffer because, only the specified number of documents showing the matching degree less than the upper limit or higher than the lower limit are arranged.

FIG. 4 shows this operation. When the searching result 152 is obtained, all matching degrees of the document are obtained every searching request. However, only the documents (hatched blocks, each block represents two results) showing the desired ranking group are arranged in the buffer 124. In response to the lower rank searching request 141 or the higher rank searching request 141, only the documents of the lower or higher ranking group are arranged.

In step 205, the number of the desired results is inputted. However, it is also possible that a predetermined number is set as a reference.

(SECOND EMBODIMENT)

Figure 10:
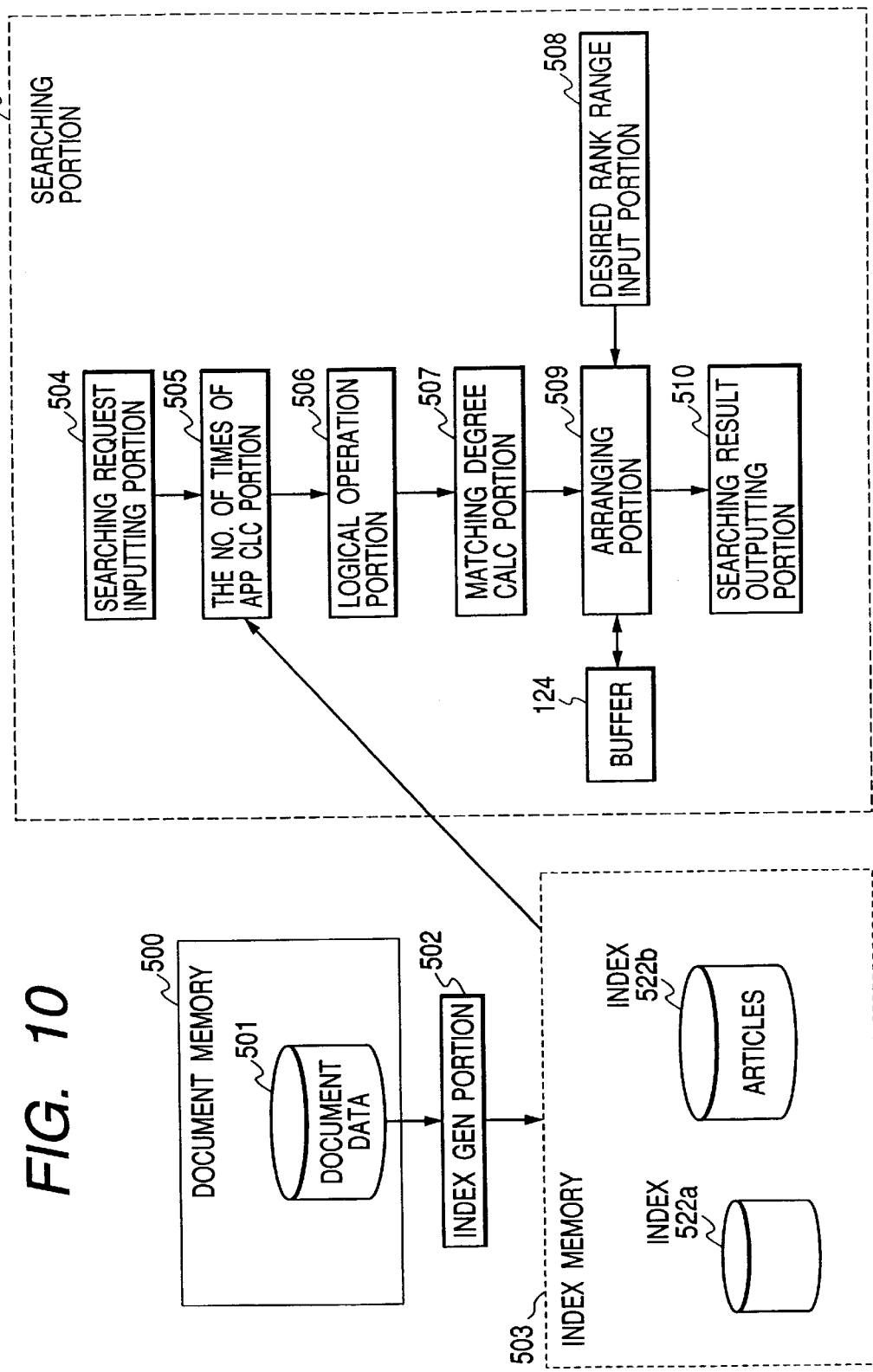
FIG. 10 is a block diagram of a document searching apparatus of the second embodiment.

A searching apparatus of a second embodiment will be described. FIG. 10 is a block diagram of a document searching apparatus of the second embodiment.

The searching apparatus of the second embodiment includes a document memory 500 such as a hard disc unit for storing documents, an index generation portion 502 for generating indexes 522a and 522b and a searching portion 520 for receiving a searching request and outputting a searching result on a display (not shown) or the like.

Each of document includes articles and corresponding head lines as fields.

The index generation portion 502 generates indexes 522a and 522b every field, i.e., head lines and articles.

The index generation portion 502 generates an index 522a of head lines and an index 522b of articles from the documents in the document memory 500.

The index generation portion 502 generates indexes 522a and 522b as follows:

The index generation portion 502 detects the number of times of appearances of all index key word data in each field of each document and stores the index key word data in each field of each document from the document data 501, corresponding the number of times of appearances of index key word data in each field of each document, and the document number of each document as the index 522a or 522b.

The searching portion 520 includes a searching request inputting portion 504 for receiving a searching request including key word data, the number of times of appearance calculation portion 505, a logical operation portion 506 for effecting a logical operation, a matching degree calculation portion 507 for calculating matching degrees between the key word data and documents, an arranging portion 509 for arranging documents in a buffer 124 in order of the calculated matching degrees, a searching result outputting portion 510 for outputting the arranged documents or a portion of the arranged documents on a display or a paper, a desired rank range input portion 508 for receiving a request of the desired rank of documents to be outputted.

Figures 11, 14:
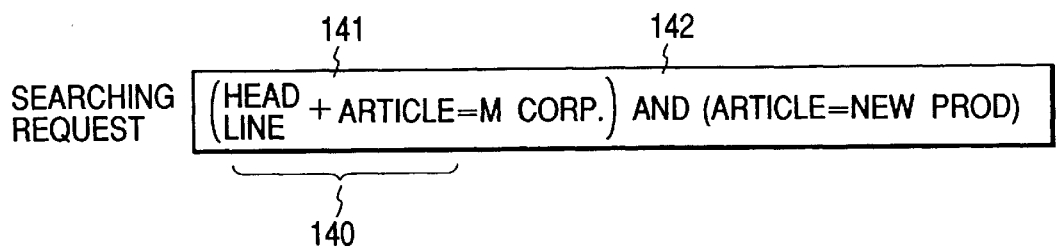
FIG. 11 is an illustration of the second embodiment showing a searching request.
FIG. 14 is a table of the second embodiment showing the matching degree calculation operation.
Figure 13:
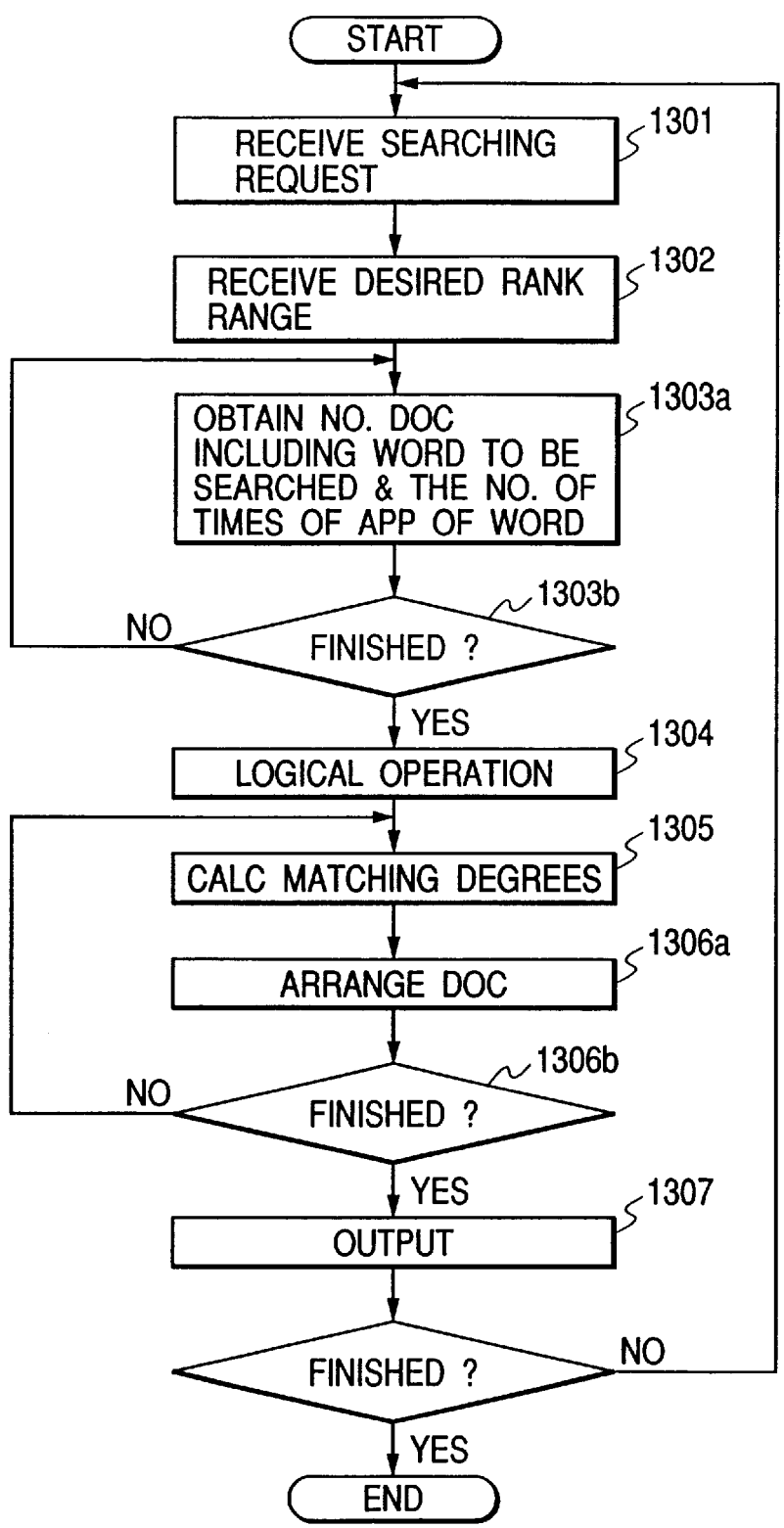
FIG. 13 depicts a flow chart of the second embodiment showing the searching operation.

FIG. 11 is an illustration of the second embodiment showing a searching request. FIGS. 12A to 12C are tables of the second embodiment showing intermediate searching results, that is, the number of the documents including the key word data and the number of the documents including the key word data with the logical operation. FIG. 13 depicts a flow chart of the second embodiment showing the searching operation. FIGS. 6A to 6C are also referred in this embodiment. FIG. 14 is a table of the second embodiment showing the matching degree calculation operation.

In step 1301, the user inputs the searching request including a searching request character train as shown in FIG. 11 with the searching request inputting portion 504. The searching request character train includes pairs of fields connected by field joining data 141 and key word data wherein pairs are connected with logical operator (AND) 142.

In step 1302, a desired rank range inputted by the user with the desired rank range input portion 508 is received. For example, the user inputs the desired rank range from eleventh to twentieth ranks.

In step 1303a, the number of times of appearance calculation portion 505 obtains the number of documents including the words to be searched corresponding to the key word data, the document number of the documents including the words, and the number of times of appearances of the word every pair of the field and key word with reference to indexes when the key word data corresponds to at least one of index key word data as shown in FIGS. 6A to 6C In step 1303b, it is judged whether processing in step 1303a has finished to all key word data. If there is a remaining key word data to be processed, processing in step 1303a is repeated.

If all key word data has been processed in step 1303b, a logical operation (506) is effected in step 1304 to provide a logical operation result as shown in FIGS. 12A to 12C. More specifically, the searching request includes a combined field "HEAD LINE+ARTICLE" 140, so that the number of times of appearances of M corp. in the fields of head line and the article are added to each other as shown in FIG. 12A. On the other hand, the result of (ARTICLE=) NEW PRODUCT) in step 1303a is used as it is as shown in FIG. 12B (without addition). Then, the logical operation portion 506 outputs the result as shown in FIGS, 12C.

In step 1305, matching degrees are calculated by the matching degree calculation portion 507. The matching degree REL (D) is given by the equation (1).

In step 1306a, the document of which matching degree has been calculated in step 1305 is successively arranged by the arranging portion 509 in the buffer 124 in order of the matching degree. This processing is repeated until finish of this processing is judged in step 1306b.

In step 1307, the searching result, that is, the documents having the eleventh to twentieth ranks are outputted by the searching result outputting portion 510 by reading the data in the buffer 124 and displaying the arranged documents on the display (not shown).

For example, in the case that the eleventh to twentieth ranked documents are requested through the desired rank range input portion 508, the arranging portion 509 sets the buffer 124 to have a capacity for storing twenty documents and stores documents successively until there is no space in the buffer 124. In the other cases, if the matching degree of the document under processing is higher than the lowest matching degree of the document stored in the buffer, the document under processing is stored in the buffer 124 with the document having the lowest matching degree stored in the buffer 124 erased. Then, arrangement has finished, the results are outputted.

As mentioned, in this embodiment, the index is generated every field. However, if there is a searching request regarding one key word data in two fields, the matching degree is calculated by logical operation for combining the two fields.

(THIRD EMBODIMENT)

Figure 15:
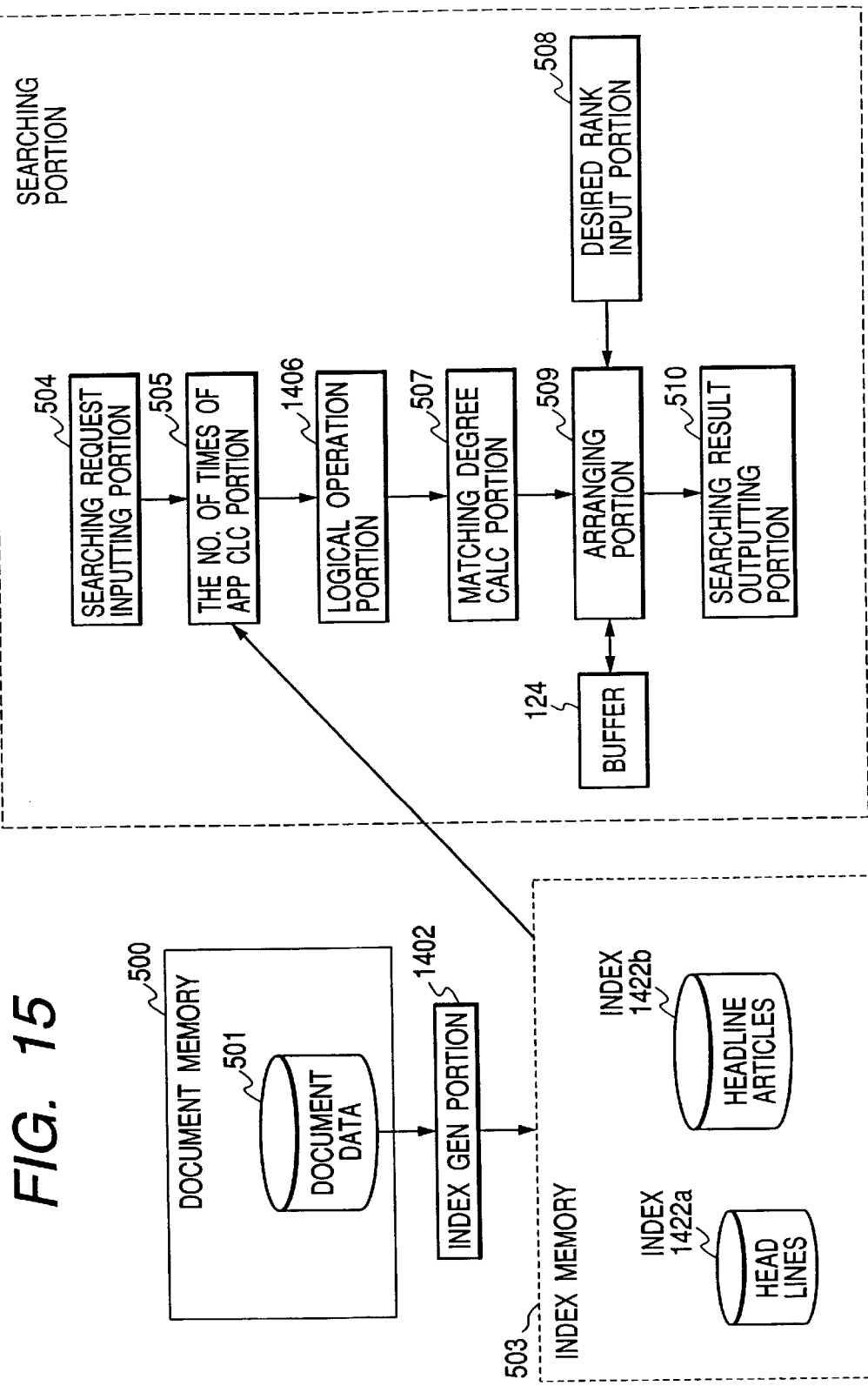
FIG. 15 is a block diagram of the searching apparatus of a third embodiment.

FIG. 15 is a block diagram of the searching apparatus of a third embodiment. FIGS. 16A to 16C are tables of the third embodiment. FIGS. 17A and 17B are tables of calculating result of the number of times of appearances and logic operation result.

The searching apparatus of the third embodiment has substantially the same structure as that of the second embodiment. The difference is that the index generation portion 1402 and the logical operation 1406 are provided instead the index generation portion 502 and the logical operation portion 506.

The index generation portion 1402 generates the index of single and combined fields.

For example, if there are frequent searching requests including the combined field searching operation in the second embodiment, i.e., "head line+article=key word data". It is better that an index of the combined fields is generated in advance. On the other hand, because there is a limit in the capacity of the index memory 503, it may be desired that the index of the single field of the article is omitted.

Then, in the third embodiment, the index generating portion 1402 generates an index 1422a of the single field of head lines and an index 1422b of the combined field of (head line+article).

At first, the number of documents including the key word data "M corp." in the index 1422b of the combined field of the article and head line is obtained as shown in FIG. 16A. The number of documents including the key word data "New product." in the index 1422b of the combined field of the article and head line is obtained as shown in FIG. 16B. Then, the number of documents including the key word "New product" in the virtual field 1601 of the article is obtained as shown in FIG. 16C.

The logical operation portion 1406 obtains the number of times of the appearances of key word data and the number of documents including the key word data regarding the field of articles by subtracting the number of times of appearances and the number of documents including the key word data of field of the head line from those of the combined field (head line+articles) as shown in FIG. 17B. After logic operation, the number of documents including the key word data "M corp." in the index 1422b of the combined field of the article and head line is as shown in FIG. 17A.

Then, the matching degree is calculated from the result of the logical operation portion 1406 and arranged in the order of the calculated matching degree and outputted.

In this embodiment, the index of the article field is omitted, so that a capacity of the index memory 503 can be reduced.

What is claimed is:

1. A document searching apparatus comprising:

storing means for storing a plurality of documents;

searching request receiving means for receiving a searching request including key word data;

matching degree calculation means responsive to said searching request for calculating matching degrees between said key word data and said documents in said storing means;

a buffer;

arranging means responsive to said matching degree calculation means for storing a portion of documents arranged in order of the calculated matching degrees, the number of said documents of said portion being equal to or less than a reference number;

searching result outputting means for outputting said portion of documents from said buffer;

lowest matching degree detecting and storing means responsive to said matching degree calculation means for detecting and storing the lowest matching degree of said documents of said portion;

lower rank document searching request receiving means for receiving a lower rank document searching request; and lower rank document searching means responsive to said lower rank document searching request for operating said matching degree calculation means and said arranging means to arrange, in said buffer, from said storing means, neighbor portion of said documents having the calculated matching degrees regarding said key word data less than the lowest matching degree from said lowest matching degree detecting and storing means as an upper limit value in order of the calculated matching degrees of said neighbour portion and operating said searching result outputting means to output said neighbour portion of documents from said buffer, the number of said documents of said neighbour portion being equal to or less than said reference number.

2. A document searching apparatus as claimed in claim 1, wherein said searching result outputting means further outputs the calculated matching degrees correspondingly of said portion of documents arranged and outputs the calculated matching degrees correspondingly of the neighbour portion of documents arranged.

3. A document searching apparatus as claimed in claim 1, further includes the number of results request receiving means for receiving a request of the number of said documents in said portion and said neighbour portion to be outputted from said buffer as said reference number.

4. A document searching apparatus as claimed in claim 1, further comprising index generating means for generating an index correspondingly including a plurality of index key word data from said documents, document number data of said documents including each of said index key word data and data of the number of times of appearances of each of said index key word data every said document, wherein said matching degree calculation means calculates said degrees of matching between said key word data and each of said documents with reference to said index when there is one of said index key word data corresponding to said key word data.

5. A document searching apparatus comprising:

storing means for storing a plurality of documents;

searching request receiving means for receiving a searching request including key word data;

matching degree calculation means responsive to said searching request for calculating matching degrees between said key word data and said documents in said storing means;

a buffer;

arranging means responsive to said matching degree calculation means for storing a portion of documents arranged in order of the calculated matching degrees, the number of said documents of said portion being equal to or less than a reference number;

searching result outputting means for outputting said portion of documents from said buffer;

lowest matching degree detecting and storing means responsive to said matching degree calculation means for detecting and storing the lowest matching degree of said documents of said portion;

lower rank document searching request receiving means for receiving a lower rank document searching request;

lower rank document searching means responsive to said lower rank document searching request for operating said matching degree calculation means and said arranging means to arrange, in said buffer, from said storing means, lower rank portion of said documents having the calculated matching degrees regarding said key word data less than the lowest matching degree from said lowest matching degree detecting and storing means as an upper limit value in order of the calculated matching degrees of said lower rank portion and operating said searching result outputting means to output said lower rank portion of documents from said buffer, the number of said documents of said lower rank portion being equal to or less than said reference number;

highest matching degree detecting and storing means responsive to said matching degree calculation means for detecting and storing the highest matching degree of said documents of said lower rank portion;

higher rank document searching request receiving means for receiving a higher rank document searching request; and higher rank document searching means responsive to said higher rank document searching request for operating said matching degree calculation means and said arranging means to arrange, in said buffer, from said storing means, higher rank portion of said documents having the calculated matching degrees regarding said key word data higher than the highest matching degree from said highest matching degree detecting and storing means as a lower limit value in order of the calculated matching degrees of said higher rank portion and operating said searching result outputting means to output said higher rank portion of documents from said buffer, the number of said documents of said higher rank portion being equal to or less than said reference number.

6. A document searching apparatus comprising:

storing means for storing a plurality of documents every edition which is renewable;

latest edit detection means responsive to said storing means for detecting the latest edition of said edition and generating latest edition data;

first searching request receiving means for receiving a first searching request including key word data;

matching degree calculation means responsive to said first searching request for calculating matching degrees between said key word data and said documents of the latest edition in said storing means with reference to said latest edition data;

a buffer;

arranging means responsive to said matching degree calculation means for storing a portion of documents of the latest edition indicated by said latest edition data arranged in order of the calculated matching degrees, the number of said documents of said portion being equal to or less than a reference number, said latest edition being referred as a used edition;

edition data storing means for storing said latest edition data used in said arranging means as used-edition data indicative of said used edition;

first searching result outputting means responsive to said arranging means for outputting said portion of documents from said buffer;

second searching request receiving means for receiving a second searching request;

searching means responsive to said second searching request for operating said matching degree calculation means and said arranging means to arrange a neighbour portion of said documents of said used edition indicated by said used-edition data in said buffer; and second searching result outputting means for outputting said neighbour portion of documents from said buffer.

7. A document searching apparatus comprising:

storing means for storing a plurality of documents, each document including a plurality of fields;

index generation means for generating indexes from said fields respectively, each index including a plurality of index key word data included in each field of said documents, document numbers of said documents including each of said index key word data, and the number of times of appearances of each of said index key word data in each field in said documents correspondingly;

a buffer;

searching request receiving means for receiving a searching request including key word data, and field data indicative of more than one of said fields;

calculating means for calculating the number of times of appearances of one of a plurality of said index key word corresponding to said key word data as search data every document in each field and the number of documents including said search data in each field with reference to said indexes;

operation means responsive to said field data for summing up the number of times of appearances of said search word data of respective fields of said more than one of said fields every document and the number of documents including said search data in said more than one of said fields in accordance with the result of said calculating means;

matching degree calculation means for calculating matching degrees between said key word data and said documents in said more than one of said fields in accordance with the result of said operation means to provide combined matching degrees;

arranging means for storing a portion of said documents in said buffer in order of the combined matching degrees; and searching result outputting means for outputting said portion of documents in response to said arranging means.

8. A document searching apparatus comprising:

storing means for storing a plurality of documents, each document including at least first and second fields;

index generation means for generating a first index of said first field including a plurality of first index key word data included in said first field of said documents, document numbers of said documents including each of said first index key word data, and the number of times of appearances of each said first index key word data in said first field of said documents correspondingly and a second index of a combined field of said first and second fields including a plurality of second index key word data of said combined field of said documents, document numbers of said documents including each of said second index key word data, and the number of times of appearances of each of said second index key word data in said combined field in said documents, correspondingly;

a buffer;

searching request receiving means for receiving a searching request including key word data and field data of said second field;

calculating means for calculating the number of times of appearances of one of a plurality of said first index key word data corresponding to said key word data as first search data every document and the number of documents including said first search data in said first field with reference to said first index and calculating the number of times of appearances of one of a plurality of said second index key word data corresponding to said key word data as second search data every document and the number of documents including said second search data in said combined field with reference to said second index of a combined field;

operation means responsive to said field data for subtracting the number of times of appearances of said first search data every document in said first field from the number of times of appearances of said second search data every document in said combined field and obtaining the number of documents including either of said first or second search word data in said combined field with reference to said first and second indexes;

matching degree calculation means for calculating matching degrees between said key word data and said documents in said second field in accordance with the result of said operation means;

arranging means for storing a portion of said documents in said buffer in order of said matching degrees; and searching result outputting means for outputting said portion of documents in response to said arranging means.

\* \* \* \* \*